Sept. 29, 1959

J. W. LOVEGROVE 2,906,348

ANTI-GUST STOP

Filed Dec. 5, 1956

INVENTOR.
John W. Lovegrove
BY
Attorneys

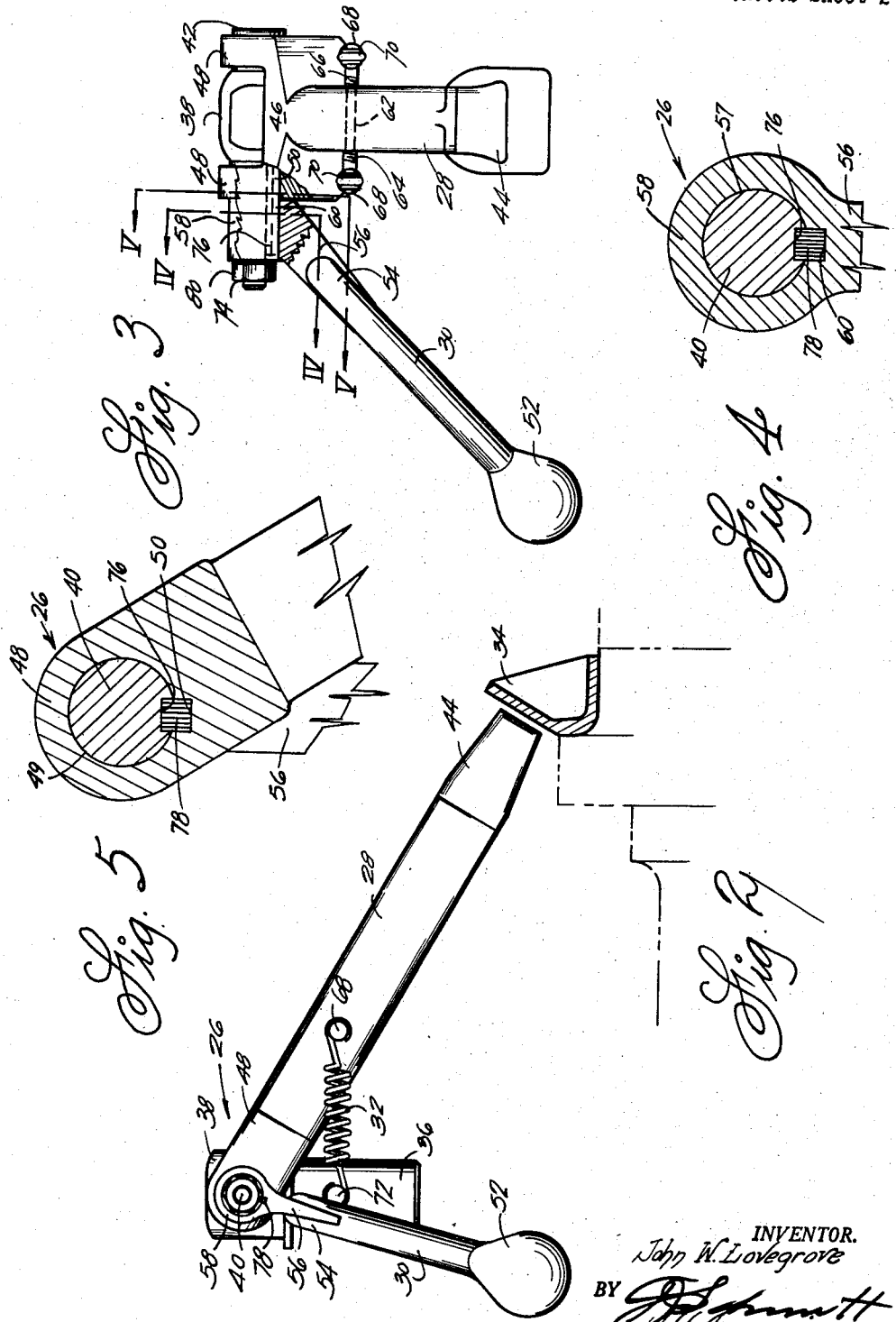

United States Patent Office 2,906,348
Patented Sept. 29, 1959

2,906,348
ANTI-GUST STOP

John W. Lovegrove, Shelton, Conn., assignor, by mesne assignments, to the United States of America as represented by the Secretary of the Navy Application December 5, 1956, Serial No. 626,560

4 Claims. (Cl. 170—160.55)

This invention relates to an anti-gust stop for the main rotor blades of a helicopter.

When a helicopter is in flight, it is essential that the main rotor blades be allowed to flap and cone. This unrestrained movement is necessary to prevent undesirable actions resulting from such things as gyroscopic and transverse moments and wind gusts. However, during ground operation and handling, this unrestrained flapping and coning is undesirable.

This invention provides a rotor blade gust stop for restraining the blade against a sudden or quick upward movement due to wind gusts or the like when the rotor is slowed down or stopped. More particularly, the gust stop of the instant invention provides a means for preventing the upward movement or rotation of a rotor blade beyond a predetermined position or elevation. The design of the stop is such that it will be automatically removed when the rotor reaches about 50 r.p.m. so that normal flapping or coning may be achieved. The stop mechanism consists of a bearing arm, a counterweight arm and a stop. When the rotor reaches 50 r.p.m. the flyweight moves out to displace the bearing arm from the stop.

It is an object of this invention to provide an anti-gust stop for helicopters that will restrain the main rotor blade against upward movement beyond a predetermined position when the rotor is slowed down or stopped.

Other objects and many of the attendant advantages of this invention will be readily appreciated as the same becomes better understood by reference to the following detailed description when considered in connection with the accompanying drawings wherein:

Figure 2 is an enlarged front view of the anti-gust stop.

Figure 3 is a side view of the anti-gust stop.

Figure 4 is a section taken along the line IV—IV of Figure 3.

Figure 5 is a section taken along the line V—V of Figure 3.

Figure 1:
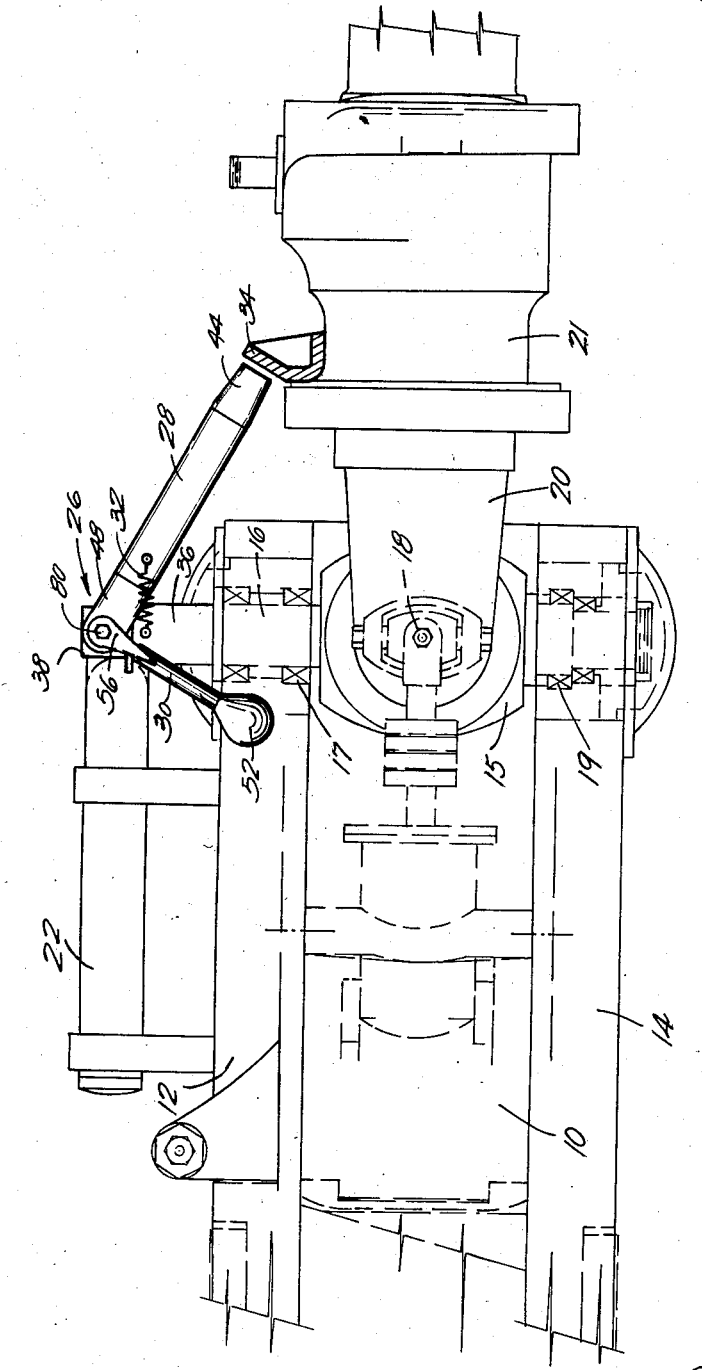
Figure 1 is a detail view of a helicopter rotor head incorporating the invention.

As viewed in the drawings, there is disclosed in Figure 1 a rotor head for a helicopter wherein the main hub 10 thereof supports upper and lower star plates 12 and 14 respectively. Between star plates 12 and 14 is mounted a drag link 15 having a pair of opposed trunnion-like pivots 16, 16 thereon which are journalled in bearings 17 and 19 carried by star plates 12 and 14, respectively, for rotation about a substantially vertical axis. The drag link 15 in turn carries a flapping pivot or pin 18 about which the flapping link 20 may rotate. A rotor blade 21 is carried by the flapping link 20, being attached thereto by any suitable means, and is mounted in a conventional manner on bearings (not shown) carried by the flapping link for rotation about its longitudinal axis to change the pitch thereof. On the top of the upper plate 12 there is mounted the pitch changing linkage 22 which cooperates with a pitch horn or the like (not shown) for controlling the pitch of the rotor blade 21. The anti-gust stop, indicated generally as 26, is mounted on the drag link pivot 16 on the top of the star plate 12. This gust stop 26 pivots about the mounting on the drag link pivot 16 and rotates therewith so that it is in continual alignment with the flapping link 20. The anti-gust stop generally encompasses a bearing arm 28, a counterweight arm 30, a spring 32 and a bearing pad 34.

More particularly, the anti-gust stop comprises a base 36 carried by the drag link pivot 16 for rotation therewith. Base 36 includes an upper portion 38 which pivotally receives a bolt 40 (Figures 2–5) which has an enlarged head 42 (Figure 3).

The bearing arm 28 has an elongated body that tapers to a blunt end 44 adjacent the bearing pad 34 which is mounted on the flapping link 20. At the other end, the bearing arm has a bifurcated section 46 with ears or fork elements 48 that straddle the upper portion 38 of the base 36. Each of the ears 48 has an opening or aperture therein to receive the bolt 40 and in one of the ears there is formed a key way 50 (Figures 3 and 5).

The counterweight arm 30 has an enlarged portion 52 which is the counterweight. At the other end 54 there is secured an angular off-set member 56 with an opening or passage 57 (Figure 4) in the head portion 58 to receive the bolt 40. The opening 57 in the head portion 58 is formed with a key way 60 therein (Figure 4).

The bearing arm 28 is provided with a mounting for the springs 32. A stud 62 (Figure 3) having threaded ends 64 and 66 extends through the bearing arm on an axis perpendicular to the longitudinal axis of the bearing arm. On each of the threaded ends 64 and 66 there are secured nuts 68, 68 having grooves 70, 70 therein for reception of one end of the springs 32. A similar mounting 72 on the base 36 supports the other end of the springs 32.

The bolt 40 is provided with a threaded end 74. Adjacent the threaded end, the bolt 40 has a key way 76 therein. In assembly, the bearing arm 28 and the counterweight arm 30 are mounted on the bolt 40 with the key ways 50, 60 and 76 aligned. A key 78 (Figures 2, 4 and 5) is inserted in the aligned key ways so that relative rotation between the bearing arm, the counterweight arm and the bolt is prevented. A nut 80 holds the parts in assembled position on the bolt 40.

When the rotor head is rotating in normal flight conditions, the centrifugal force will move the counterweight (to the right as shown in Figure 2). Movement of the counterweight will cause the bearing arm 28 to move upwards against the pressure of the springs 32 and away from the bearing pad 34 on the flapping link. This action allows the flapping link to move freely about its pivot. If the rotor is slowed down or stopped the bearing arm 28 under the urging of springs 32 will assume the position where the end 44 of the bearing arm is adjacent the pad 34, as shown in Figure 2. Thus, should the flapping link attempt to rise above a predetermined position or elevation in response to a sudden gust of wind or the like acting on rotor 21, the bearing pad 34 will abut against the end 44 of the bearing arm and prevent the flapping link from rising.

Obviously many modifications and variations of the present invention are possible in the light of the above teachings. It is therefore to be understood that within the scope of the appended claims the invention may be practiced otherwise than as specifically described.

What is claimed is:

1. In a helicopter rotor assembly including a hub member rotatable about a fixed axis of rotation, a pair of opposed star plates carried by said hub member and being rotatable therewith about said fixed axis, a drag link having a pair of opposed pivots thereon rotatably carried by said star plates and being rotatable with said star plates about said fixed axis and rotatable relative to said star plates about an axis defined by said pair of opposed pivots, a flapping link pivotally connected to said drag link for rotation in opposite directions in a substantially vertical plane and a rotor blade carried by said flapping link for rotation therewith in opposite directions in said substantially vertical plane, a stop means for limiting the upward rotary movement of said flapping link and said rotor blade beyond a predetermined position in said substantially vertical plane comprising a base member carried by one of said drag link pivots and being rotatable therewith relative to said star plates about said axis defined by said pair of opposed pivots, bolt means carried by said base member and being rotatable relative thereto, a bearing arm carried by said bolt means for rotation in a substantially vertical plane, a counterweight arm carried by said bolt means for rotation in a substantially vertical plane, means connecting said bolt means, said bearing arm and said counterweight arm for rotary movement as a unit, resilient means connecting said bearing arm and said base member and being operable to normally rotate said bearing arm and said counterweight arm in one direction and hold said bearing arm and said counterweight arm in a predetermined position when the angular velocity of said hub member is below a predetermined value, weight means carried by said counterweight arm and being operable to effect rotation of said bearing arm and said counterweight arm in the opposite direction beyond said predetermined position when said angular velocity of said hub member exceeds said predetermined value, and bearing pad means carried by said rotor blade and being engageable with said bearing arm when said bearing arm and said counterweight arm are held in said predetermined position to thereby prevent the upward rotary movement of said flapping link and said rotor blade beyond said predetermined position in said substantially vertical plane.

2. In a helicopter rotor assembly as claimed in claim 1 wherein said bearing arm is bifurcated at one end and is provided with a bearing surface on the opposite end thereof, said bifurcated end having a pair of aligned apertures therein for the passage therethrough of said bolt means and said bearing surface being adapted to engage said bearing pad means carried by said rotor blade.

3. In a helicopter rotor assembly as claimed in claim 1 wherein said means connecting said bolt means, bearing arm and counterweight arm is comprised of a key, said bolt means being provided with a keyway therein which is adapted to register with axially aligned keyways in said bearing arm and said counterweight arm for the reception of said key.

4. In a helicopter rotor assembly as claimed in claim 1 wherein said bearing arm is bifurcated at one end thereof, said bifurcated end being carried by said bolt means and being adapted to straddle said base member.

References Cited in the file of this patent
UNITED STATES PATENTS

| | | |
|---|---|---|
| 2,614,640 | Buivid | Oct. 21, 1952 |
| 2,719,593 | Alex | Oct. 4, 1955 |